(12) United States Patent
Dieterich et al.

(10) Patent No.: US 12,368,338 B2
(45) Date of Patent: Jul. 22, 2025

(54) CONNECTION DEVICE FOR A STATOR, STATOR ARRANGEMENT FOR AN ELECTRIC MACHINE, METHOD FOR PRODUCING A STATOR ARRANGEMENT AND ELECTRIC MACHINE FOR DRIVING A VEHICLE

(71) Applicant: Valeo eAutomotive Germany GmbH, Erlangen (DE)

(72) Inventors: Sebastian Dieterich, Bad Neustadt a.d.Saale (DE); Bianca Hofmann, Bad Neustadt a.d.Saale (DE); Michael Menz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 124 days.

(21) Appl. No.: 18/257,141

(22) PCT Filed: Nov. 29, 2021

(86) PCT No.: PCT/EP2021/083347
§ 371 (c)(1),
(2) Date: Jun. 13, 2023

(87) PCT Pub. No.: WO2022/128427
PCT Pub. Date: Jun. 23, 2022

(65) Prior Publication Data
US 2024/0106294 A1    Mar. 28, 2024

(30) Foreign Application Priority Data
Dec. 15, 2020   (DE) ............... 10 2020 215 909.2

(51) Int. Cl.
*H02K 3/50*    (2006.01)
*H02K 15/02*   (2006.01)
*H02K 15/33*   (2025.01)

(52) U.S. Cl.
CPC ............... *H02K 3/50* (2013.01); *H02K 15/02* (2013.01); *H02K 15/33* (2025.01); *H02K 2203/09* (2013.01)

(58) Field of Classification Search
CPC ....... H02K 3/50; H02K 15/33; H02K 2203/09
(Continued)

(56) References Cited

U.S. PATENT DOCUMENTS 3,457,442 A * 7/1969 Crites ...................... H02K 3/50
                                                   310/260
5,233,246 A * 8/1993 Yockey .................. H02K 11/40
                                                   310/71
(Continued)

OTHER PUBLICATIONS

International Search Report issued Mar. 23, 2022 in PCT/EP2021/083347 filed on Nov. 29, 2021, 2 pages.

*Primary Examiner* — Alexander Talpalatski
(74) *Attorney, Agent, or Firm* — Oblon, McClelland, Maier & Neustadt, L.L.P.

(57) ABSTRACT

Connection device for a stator having a stator winding, including N phases, first and second connection units which each comprise N contact portions and a conductor arrangement. The contact portions of the first connection unit are each designed for electrically conductive contacting of one of N connection portions of the stator winding, and the conductor arrangement of the first connection unit electrically conductively connects the contact portions of the first connection unit. The contact portions of the second connection unit are each designed for electrically conductive contacting of one of N further connection portions of the stator winding and the conductor arrangement of the second connection unit comprises N conductor portions, which are electrically insulated from each other and are each electrically conductively connected to one of the N contact por- (Continued)

tions of the second connection unit. A fastening mechanism permits the connection units to be detached and fastened.

20 Claims, 8 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 5,682,070 | A * | 10/1997 | Adachi | H02K 19/22 |
| | | | | 310/71 |
| 6,825,586 | B2 * | 11/2004 | Edrington | H02K 5/225 |
| | | | | 310/71 |
| 10,910,924 | B2 * | 2/2021 | Kodama | H02K 3/04 |
| 11,670,980 | B2 * | 6/2023 | Ryu | H02K 1/165 |
| | | | | 310/254.1 |
| 2001/0002776 | A1 | 6/2001 | Suzuki et al. | |
| 2005/0136707 | A1 | 6/2005 | Kiyota | |
| 2009/0026859 | A1 | 1/2009 | Kinoshita et al. | |

* cited by examiner

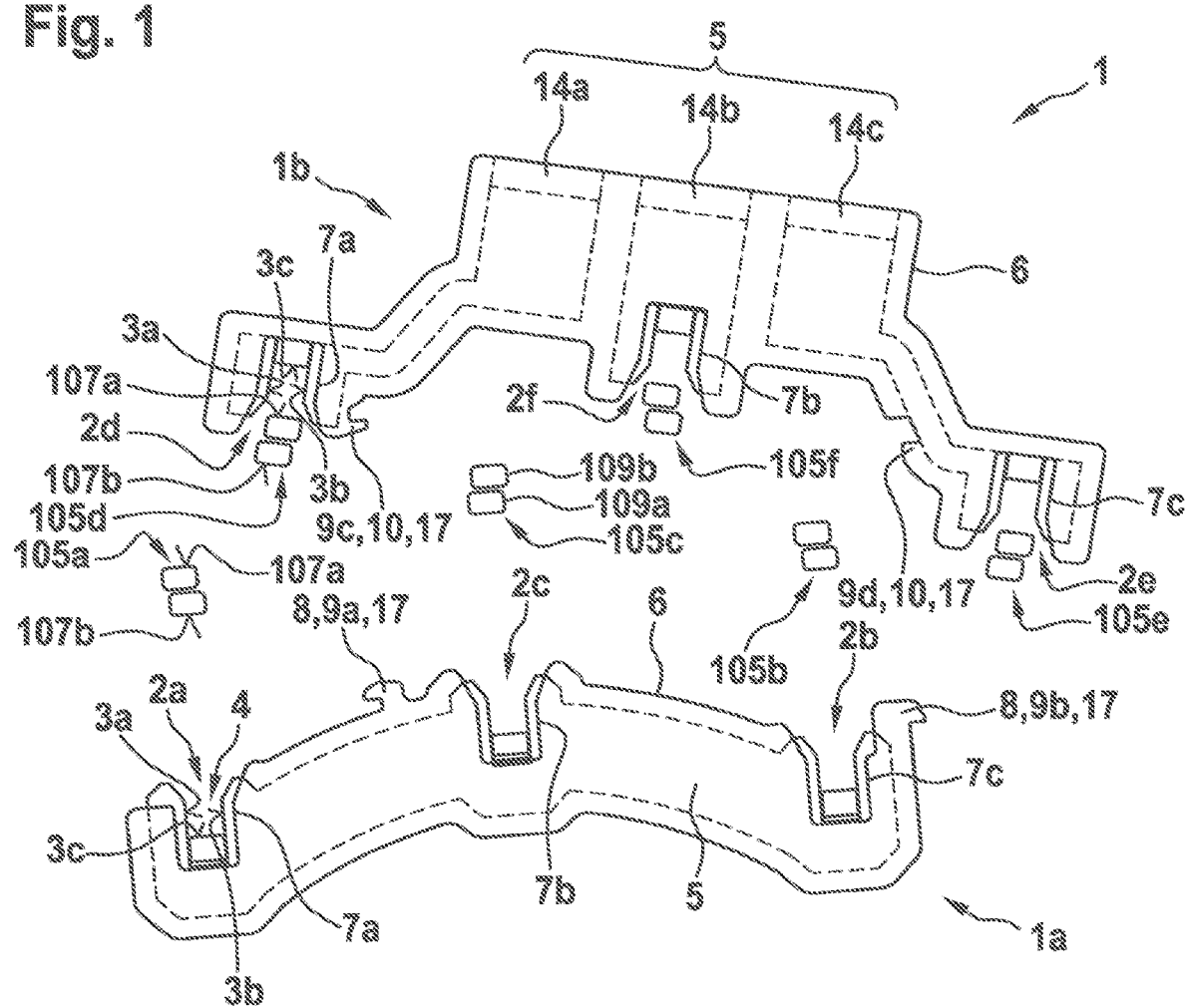

CONNECTION DEVICE FOR A STATOR, STATOR ARRANGEMENT FOR AN ELECTRIC MACHINE, METHOD FOR PRODUCING A STATOR ARRANGEMENT AND ELECTRIC MACHINE FOR DRIVING A VEHICLE

The present invention relates to a connection device for a stator having a stator winding comprising a number N of phases. In addition, the invention relates to a stator arrangement for an electric machine, a method for producing a stator arrangement and an electric machine for driving a vehicle.

Stators having a stator winding comprising N phases are generally known. If the stator winding of such a stator comprises connection portions which are provided, for example, to form a star point and connection portions which are provided, for example, to form connections for the phases, then a connection device is required, which contacts the connection portions of the stator winding accordingly.

The invention is based on the object of specifying an easy-to-assemble option for connecting connection portions of a stator.

This object is achieved according to the invention by a connection device for a stator having a stator winding, comprising a number N of phases, comprising a first connection unit and a second connection unit, which each comprise N contact portions and a conductor arrangement, wherein the contact portions of the first connection unit are each designed for electrically conductive contacting of one of N connection portions of the stator winding and the conductor arrangement of the first connection unit electrically conductively connects the contact portions of the first connection unit r, wherein the contact portions of the second connection unit are each designed for electrically conductive contacting of one of N further connection portions of the stator winding and the conductor arrangement of the second connection comprises N conductor portions, which are electrically insulated from each other and are each electrically conductively connected to one of the N contact portions of the second connection unit, wherein a fastening means is provided, by means of which the first connection unit and the second connection unit can be transferred from a detached position into a fastened position, in which the first connection unit and the second connection unit are fastened to each other and the conductor arrangement of the first connection unit and the conductor arrangement of the second connection unit are electrically insulated from each other.

The connection device according to the invention for a stator having a stator winding comprising a number N of phases comprises a first connection unit and a second connection unit. The first connection unit and the second connection unit each comprise N contact portions. The first and the second connection unit each comprise a conductor arrangement. The contact portions of the first connection unit are each designed for electrically conductive contacting of one of N connection portions of the stator winding. The conductor arrangement of the first connection unit electrically conductively connects the contact portions of the first connection unit. The contact portions of the second connection unit are each designed for electrically conductive contacting of one of further N connection portions of the stator winding. The conductor arrangement of the second connection unit comprises N conductor portions. The N conductor portions are electrically insulated from each other. The N conductor portions are each electrically conductively connected to one of the N contact portions of the second connection unit. A fastening means is provided. By means of the fastening means, the first connection unit and the second connection unit can be transferred from a detached position into a fastened position. In the fastened position, the first connection unit and the second connection unit are fastened to each other. In the fastened position, the conductor arrangement of the first connection unit and the conductor arrangement of the second connection unit are furthermore electrically insulated from each other.

The connection device according to the invention is notable in particular for the fastening means, which enables the connection units to be designed separately and to be fastened to each other. In the fastened position, the contact portions of the first connection unit and of the second connection unit are contacted by connection portions of the stator winding. At the same time, a relative position of the contact portions of the connection units can be defined in relation to the connection portions of the stator winding. This enables the connection portions to be fastened to the connection units, for example by welding, without additional tools for positioning the connection portions. A corresponding stator arrangement having the stator and the connection device may therefore be designed such that it is particularly easy to assemble.

It is preferred that the first connection unit and the second connection unit are furthermore designed to absorb a restoring force of the connection portions in the fastened position, in particular in order to compensate positioning tolerances of the connection portions. The conductor arrangement of the first connection unit is preferably formed integrally from an electrically conductive material. The conductor arrangement of the first connection unit may be designed to be arcuate, crescent-shaped or even linear. A respective contact portion may form a receiving chamber for one of the connection portions. Adjacent pairs of contact portions of the first connection unit and/or of the second connection unit are preferably arranged equidistantly. The conductor portions of the second connection unit are preferably formed by separate electrical conductors, each formed integrally. N is preferably equal to or greater than three, in particular precisely three. The mutual relative positions of the conductor portions are preferably defined by the first and/or the second connection unit.

In general, in the connection device according to the invention, provision may be made for one of the connection units, in particular the first connection unit or the second connection unit, to comprise an insulation body, which is arranged, preferably moulded, on the conductor arrangement of the one connection unit. Alternatively or additionally, the other one of the connection units may comprise an insulation body which is arranged, preferably moulded, on the conductor arrangement of the one connection unit. The or a respective insulation body may be formed by a sheath surrounding the conductor arrangement in portions and/or continuously. The insulation body preferably comprises openings which expose the contact portions. The or a respective insulation body is preferably formed by extrusion-coating the conductor arrangement. Other shaping coatings of the conductor arrangement are also possible. The insulation body may also be produced separately using any shaping method and only mounted on the conductor arrangement in a final step. If the insulation body is arranged on the second connection unit, it may define mutual relative positions of the conductor portions.

In the connection device according to the invention, it is preferred that the fastening means comprises a first fastening portion and a second fastening portion, which engage with each other in the fastened position. By means of the first fastening portion and the second fastening portion, the connection units may be connected together by form fit and/or by force fit in the fastened position.

In particular, the fastening means comprises a first fastening portion and a second fastening portion, which engage with each other in the fastened position. One of the first or second of the connection units here comprises an insulation body, which is arranged on the conductor arrangement of the one of the first or second of the connection units and forms the first fastening portion. The second fastening portion here is formed by the other first or second connection units.

In a development, provision may furthermore be made for the first fastening portion and the second fastening portion to each form a latching element, wherein the latching element of the first fastening portion and the latching element of the second fastening portion engage with each other in the fastened position to form a latching connection. The latching connection here enables a simple fastening without additional tools. It is possible that the first fastening portion and the second fastening portion furthermore each form one or more further corresponding latching elements. One of the latching elements or a respective latching element may be designed to be elastically deformed during the transition from the detached position into the fastened position.

Alternatively or additionally, provision may be made for one of the fastening portions to form a protrusion and the other of the fastening portions to form a recess corresponding to the protrusion, wherein the fastening portions engage with each other in the fastened position to produce a form fit. The protrusion and the recess preferably have a diametrically opposed configuration. The fastening portions may comprise one or more further protrusions and recesses.

The insulation body of the connection unit preferably forms the first fastening portion. The second fastening portion is particularly preferably formed by the other of the connection units.

According to a first design variant, the insulation body of the other of the connection units forms the second fastening portion. It is therefore possible that the fastening portions or the fastening means is or are formed by the insulation bodies of the connection units.

According to a second design variant, provision is made for the second fastening portion to be formed by the conductor arrangement of the other of the connection units. In this case, therefore, the insulation body is connected to the conductor arrangement, which forms the fastening portions, such that they engage with each other.

In the connection device according to the invention, provision may be made for the fastening means to be designed to force the first connection portion and the second connection portion together in the fastened position as a result of a force acting on the first connection unit and the second connection unit, so that the connection portions of the stator can be electrically conductively fastened to the contact portions, in particular by a substance-bonded joining technique. In this configuration, the fastening means is therefore provided as an additional component, which is separate from the connection units. The fastening means is preferably designed such that it can be detached from the connection units in the fastened position, in particular moved back into the detached position.

Provision may furthermore be advantageously made for a respective contact portion of the first connection unit to be designed as a recess of the conductor arrangement of the first connection unit. Alternatively or additionally, provision may be made for a respective contact portion of the second connection unit to be designed as a recess of one of the conductor portions of the conductor arrangement of the second connection unit. As a result of the recess, the receiving chamber may be designed to receive the connection portions to be contacted, which inhibits a movement of the connection portion in two spatial directions. An orientation of the connection portions may thus be defined. A holding force exerted by the fastening means is preferably sufficient to hold the connection units in a predetermined position in the fastened position.

The conductor arrangement of the first connection unit is preferably designed as a busbar. Alternatively or additionally, a respective conductor portion of the conductor arrangement of the second connection unit may be designed as a busbar.

The contact portions of the first connection unit and/or of the second connection unit may each comprise a guide, wherein a respective contact portion comprises a wall which delimits the receiving chamber on one side, and the guide of the contact portion comprises a wall which slopes away from the receiving chamber at an angle to the wall of the contact portion. positioning tolerances of the connection portions when arranging the connection unit on the connection portions may be compensated by means of the guide. If, for manufacturing reasons, the connection portions are not precisely aligned according to the positions of the contact portions, they may received, or—metaphorically speaking—captured, more easily in the receiving chambers as a result of the guide. The arrangement of the connection portions in the contact portions may thus be made significantly easier and may be easily automated. The ease of assembly may therefore be advantageously increased.

The guide is preferably arranged on an end of a respective contact portion which is opposite the conductor arrangement. The Nth contact portion is preferably arranged between the first and the (N−1)th contact portion of the first connection unit and/or second connection unit. The guide is preferably designed to adjoin the wall of the contact portion. The first wall of the guide may enclose an, in particular obtuse, angle with the first wall of the contact portion.

In the connection unit according to the invention, provision may be made for the Nth contact portion of the first connection unit and/or second connection unit to comprise a second wall, which delimits the receiving chamber on one side on a side opposite the first wall so that the Nth contact portion is designed to enclose the connection portion. The Nth contact portion may therefore form a reference position for the other contact portions and enclose one of the connection portions on both sides.

In a preferred configuration, provision is made for the guide of the Nth contact portion to comprise a second wall, which slopes away from the receiving chamber at an angle to the second wall of the Nth contact portion so that the guide is widened with respect to a distance between the first wall of the contact portion and the second wall of the Nth contact portion. The guide may thus compensate the positioning tolerances of the connection portion in two directions. The second wall of the contact portion may enclose an, in particular obtuse, angle with the second wall of the guide. The first wall and the second wall of the guide may extend along straight lines, which enclose an acute angle, in particular an angle between 40 and 80 degrees.

The Nth contact portion of the first connection unit and/or second connection unit may furthermore comprise a third wall, which delimits the receiving chamber in a direction perpendicular to the first wall. The third wall may form a stop for the connection portion to be received in the receiving chamber. The third wall preferably runs perpendicularly to the second wall. The third wall may connect the first wall and the second wall.

According to a first preferred design variant, the receiving chamber of a respective one of the first to (N−1)th contact portions of the first connection unit and/or second connection unit is open on a side opposite the first wall. This enables the connection portions to be easily received in the receiving chambers when the connection portions are radially aligned with respect to each other. The connection unit may therefore be arranged on the connection portions via a linear movement directed perpendicularly to or along an extent direction of the connection portions since the connection portions which hare aligned differently in relation to the linear movement cannot become jammed on the open side.

According to a second preferred design variant, the first to (N−1)th contact portions of the first connection unit and/or second connection unit each comprise a second wall opposite the first wall, which slopes away from the receiving chamber. This enables the connection portions to be easily received in the receiving chambers when the connection portions are radially aligned with respect to each other. The connection unit may therefore be arranged on the connection portions via a linear movement directed perpendicularly to or along an extent direction of the connection portions since the connection portions which are aligned differently in relation to the linear movement do not become jammed against the second wall but may slide along it. The second wall of the contact portion preferably slopes towards the Nth contact portion.

According to a third preferred design variant, a respective one of the first to (N−1)th contact portions of the first connection unit and/or second connection unit comprises a second wall, which delimits the receiving chamber on one side on a side opposite the first wall so that the respective contact portion is designed to enclose the connection portion. The first and second walls of the N contact portions are particularly preferably aligned parallel to each other. The connection unit may therefore be arranged on the connection portions via a linear movement directed perpendicularly to or along an extent direction of the connection portions when the connection portions are aligned parallel to each other.

It is preferred here that the guides of a respective one of the first to (N−1)th contact portions each comprise a second wall, which slopes away from the receiving chamber at an angle to the second wall of the respective contact portion so that the guide is widened with respect to a distance between the first wall of the contact portion and the second wall of the respective contact portion. The second wall of the contact portion may enclose an, in particular obtuse, angle with the second wall of the guide. The first wall and the second wall of the guide may extend along straight lines, which enclose an acute angle, in particular an angle between 40 and 80 degrees. The guides of the first to Nth contact portions may have the same design.

Provision may furthermore be made for the first to (N−1)th contact portions of the first connection unit and/or second connection unit to each comprise a further wall, which delimits the receiving chamber in a direction perpendicular to the first wall. The further wall may form a stop for the connection portion to be received in the receiving chamber. If the contact portion comprises the second wall, provision may be made for the further wall to run perpendicularly to the second wall and/or to connect the first wall and the second wall.

The object on which the invention is based is furthermore achieved by a stator arrangement for an electric machine, comprising: a stator, comprising a stator core having an axial end face and a stator winding, which comprises a number N of phases and is formed in portions by shaped conductors, which extend through the stator core, and by first to 2Nth connection portions, which extend in the axial direction at the end face, adjoining part of the shaped conductors in different angular positions of a circumferential direction; and a connection device according to the invention; wherein the contact portions of the first connection unit contact the first to Nth connection portions, in particular to form a star point, and the contact portions of the second connection unit contact the (N+1)th to (2N)th connection portions, in particular to form connections for the phases.

The stator arrangement according to the invention for an electric machine comprises a stator. The stator comprises a stator core. The stator core has an axial end side. The stator furthermore comprises stator windings. The stator winding comprises a number N of phases. The stator winding is formed in portions by shaped conductors. The shaped conductors extend through the stator core. The stator winding is furthermore formed by first to 2Nth connection portions. The first to 2Nth connection portions extend in the axial direction at the end face, adjoining part of the shaped conductors in different angular positions of a circumferential direction. The stator arrangement furthermore comprises a connection device according to the invention. The contact portions of the first connection unit contact the first to Nth connection portions, in particular to form a star point. The contact portions of the second connection unit contact the (N+1)th to (2N)th connection portions, in particular to form connections for the phases.

The stator core is preferably formed by a multiplicity of mutually insulated stator laminations. A multiplicity of slots which are arranged along the circumferential direction and which extend from the end face to an axially opposed further end face may be formed in the stator core. The shaped conductors may be received in the slots.

The shaped conductors are preferably formed by rods made of an electrically conductive metal, in particular copper. The shaped conductors are preferably arranged, radially layered in a respective slot, with a predetermined even number of layers, in particular four, six, eight, ten or twelve layers. The number of phase elements typically corresponds to a number of phases of the stator.

The stator winding may be designed as a hairpin winding. At the first end face and at a second end face opposite the first end face, the shaped conductors of a respective phase may be electrically conductively connected together by connectors such that they form a series circuit or multiple series circuits. Connectors of the first type are preferably formed integrally with the shaped conductors at the first end face. At the second end face, pairs of shaped conductors may be electrically conductively connected by connectors of the second type. The connectors of the second type may each comprise two connecting portions which, in particular, integrally adjoin the shaped conductors of the pair. The connecting portions may be electrically conductively connected together in pairs, in particular by substance bonding.

Each connection portion may comprise multiple connection elements which each adjoin one of the shaped conductors. Each connection portion preferably comprises a connection element for each series circuit of the phase.

Provision may be made for the first to Nth connection portions and/or the (N+1)th to (2N)th connection portions of the stator to be radially aligned in the circumferential direction in their respective winding position.

In the stator, the connection portions may comprise a pair of parallel side faces. Provision may be made here for the first to (N−1)th connection portions to be deformed relative to the Nth connection portion such that the pairs of parallel side faces of the first to Nth connection portions are aligned substantially parallel to each other. Alternatively or additionally, the (N+1)th to (2N−1)th connection portions may be deformed relative to the (2N)th connection portion such that the pairs of parallel side faces of the (N+1)th to (2N)th connection portions are aligned substantially parallel to each other. The first to Nth connection portions or the (N+1)th to (2Nth) connection portions have the same orientation, such that their pairs of parallel side faces are aligned substantially parallel to each other.

The pairs of parallel side faces of the first to (2N)th connection portions may be aligned parallel to each other. It is, however, preferred that the pairs of parallel side faces of the first to Nth connection portions on the one hand and the pairs of parallel side faces of the (N+1)th to (2N)th connection portions on the other are aligned differently, in particular enclose an angle of greater than zero.

In a preferred configuration, the connection portions are deformed by twisting about an axis parallel to a longitudinal axis of the stator. For this, the first to (N−1)th connection portions and/or (N+1)th to (2N−1)th connection portions comprise a torsion portion which forms the torsion.

The object on which the invention is based is furthermore achieved by a method for producing a stator arrangement, comprising the following steps: Providing a stator, comprising a stator core having an axial end face and a stator winding, which comprises a number N of phases and is formed in portions by shaped conductors, which extend through the stator core, and by first to 2Nth connection portions, which extend in the axial direction at the end face, adjoining part of the shaped conductors in different angular positions of a circumferential direction; providing a connection device according to the invention; transferring the fastening means from the detached position into the fastened position such that the contact portions of the first connection portion contact the first to Nth connection portions, in particular to form a star point, and the contact portions of the second connection unit contact the (N+1)th to (2N)th connection portions, in particular to form connections for the phases.

All statements relating to the connection device can be applied to the method according to the invention here, so that the above-mentioned advantages may also be achieved thereby.

In a preferred development, the method according to the invention furthermore comprises the following step: joining the connection portions and the contact portions, in particular to form substance-bonded joints, in the fastened position of the fastening means. The joining of the connection portions and the contact portions preferably takes place by laser welding.

When using a connection device in which the fastening means comprises the fastening portions, the transfer of the fastening means from the detached position into the fastened position may comprise: executing a relative movement of the connection units towards each other along a movement direction running substantially perpendicularly, in particular perpendicularly, to an extent direction of the connection portions so that the fastening portions are connected in a mutually engaging manner. Alternatively, the transfer comprises executing a relative movement of the connection units towards each other along a movement direction running substantially parallel, in particular parallel, to an extent direction of the connection portions so that the fastening portions are connected in a mutually engaging manner.

When using connection device in which the fastening means is designed to force the first connection unit and the second connection unit together in the fastened position as a result of a force acting on the first connection unit and the second connection unit, the transfer of the fastening means from the detached position into the fastened position may comprise: forcing the first connection unit and the second connection unit together by means of the fastening means as a result of the force acting on the first connection unit and the second connection unit. Steps may furthermore be provided for detaching the fastening means and removing the fastening means after joining the connection portions and the contact portions.

The object on which the invention is based is furthermore achieved by an electric machine for driving a vehicle, comprising: a stator arrangement according to the invention or a stator arrangement obtained by the method according to the invention; and a rotor mounted rotatably inside the stator.

The electric machine is preferably designed as a synchronous machine or asynchronous machine. The rotor is preferably permanently excited.

Further advantages and details of the present invention are derived from the exemplary embodiments described below and from the drawings. The drawings are schematic illustrations in which:

FIG. 1 shows a plan view of a first exemplary embodiment of the connection device according to the invention;

FIG. 2 shows a detailed view of a contact portion of the connection unit according to the first exemplary embodiment;

Figure 5:
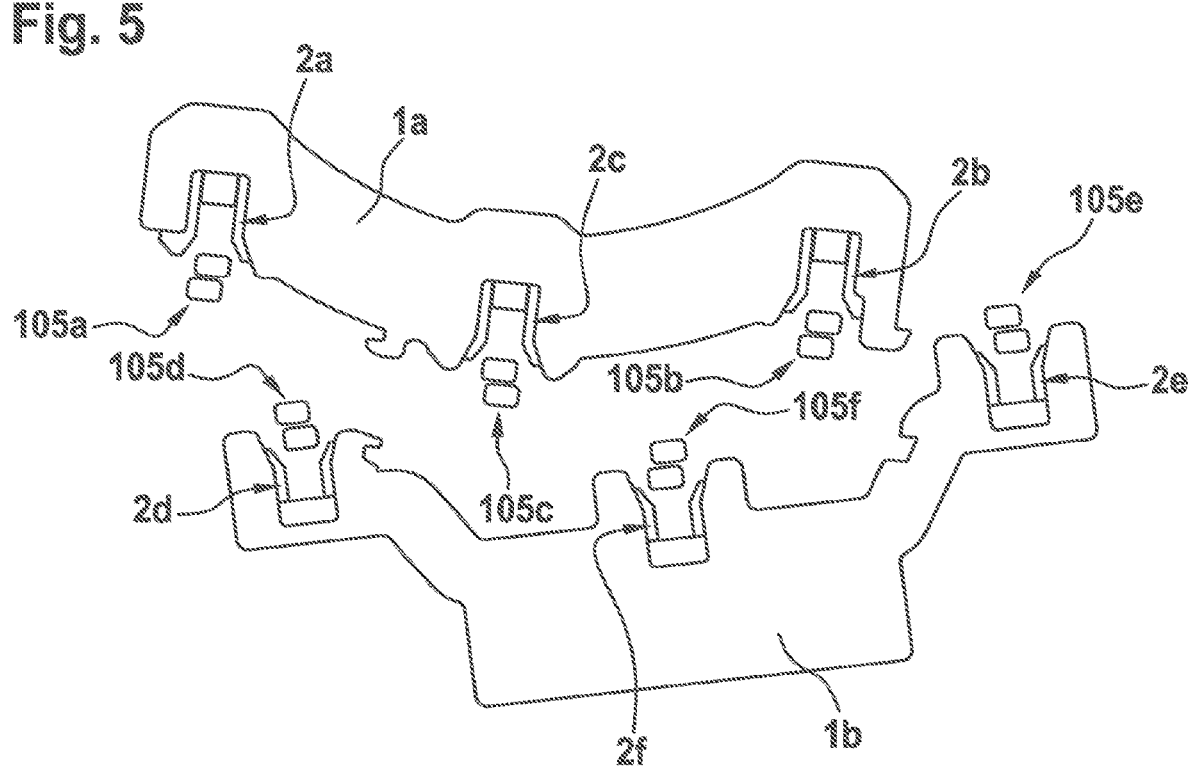
Figure 6:
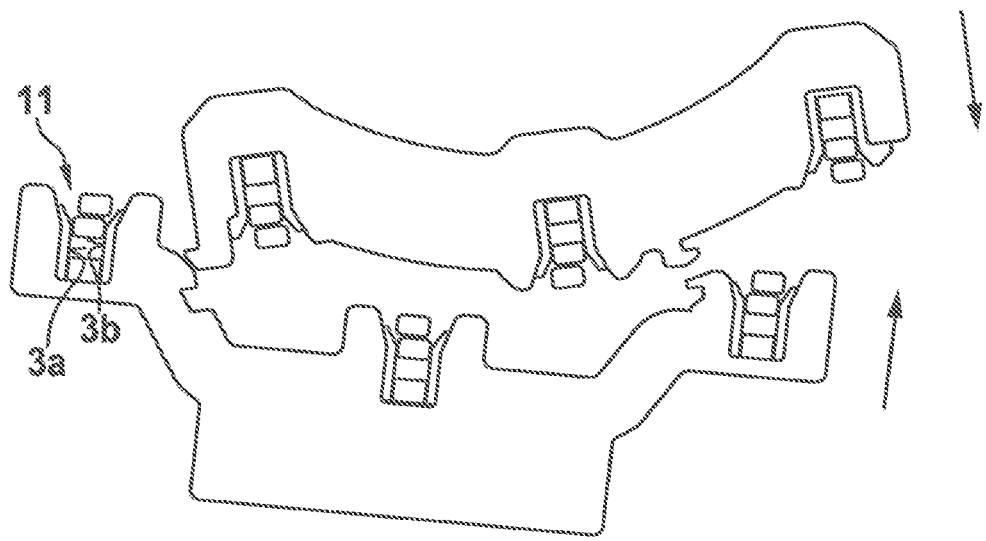
Figure 7:
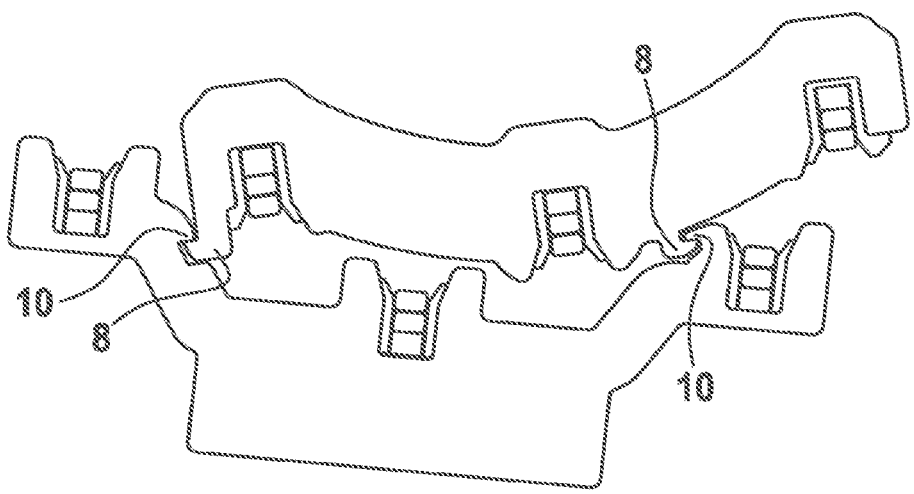
Figure 8:
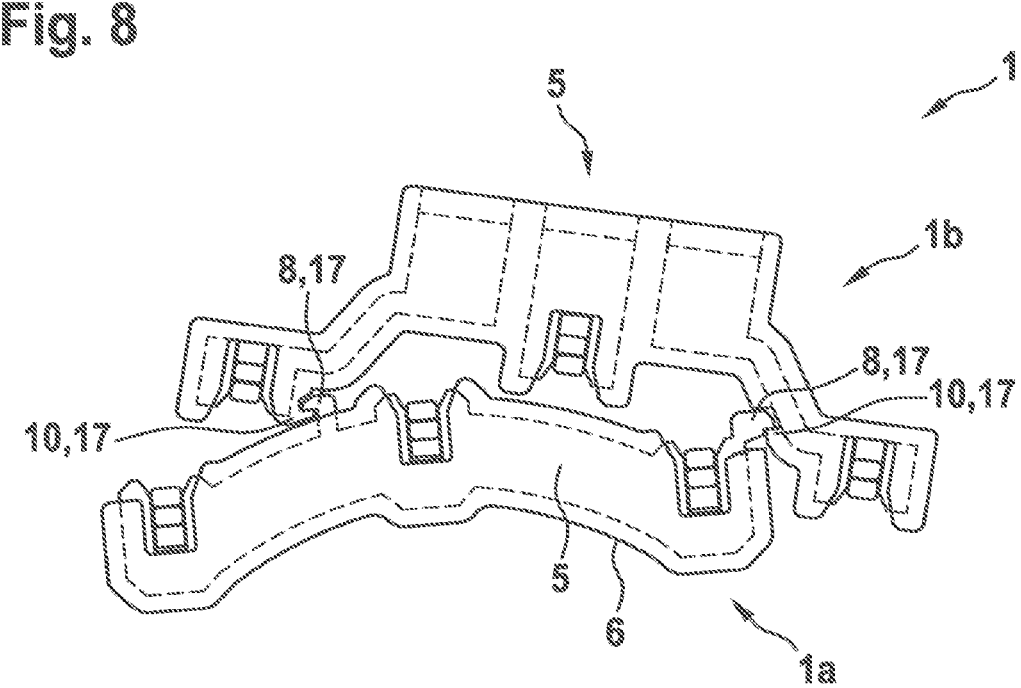
Figure 9:
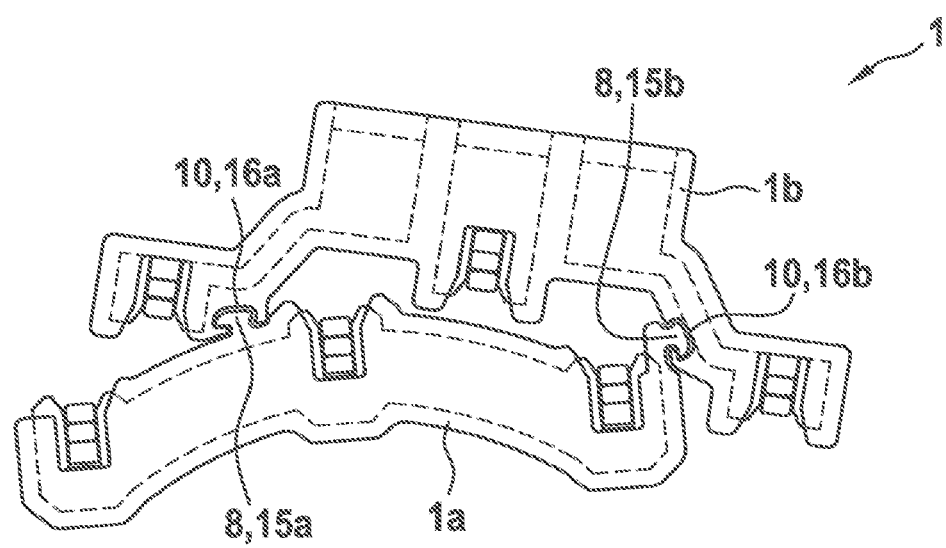
Figure 10:
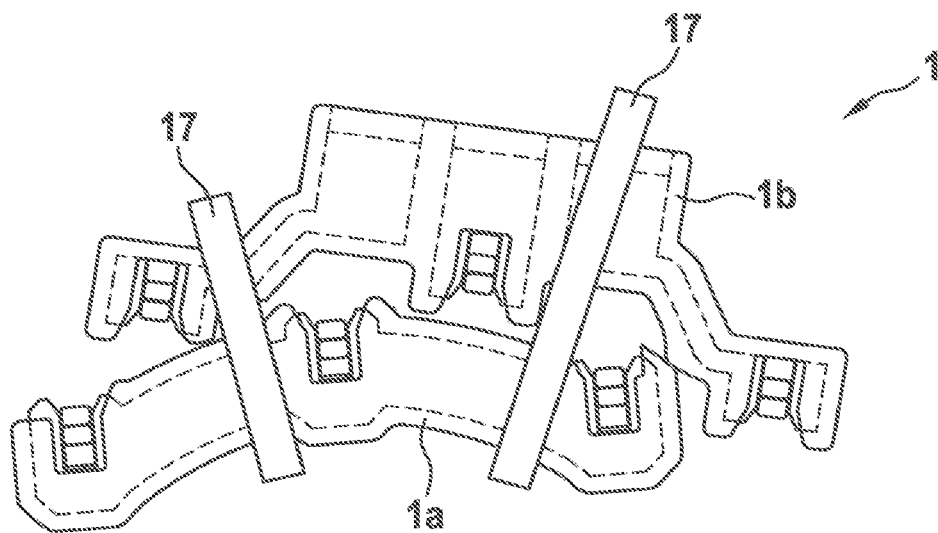
Figure 11:
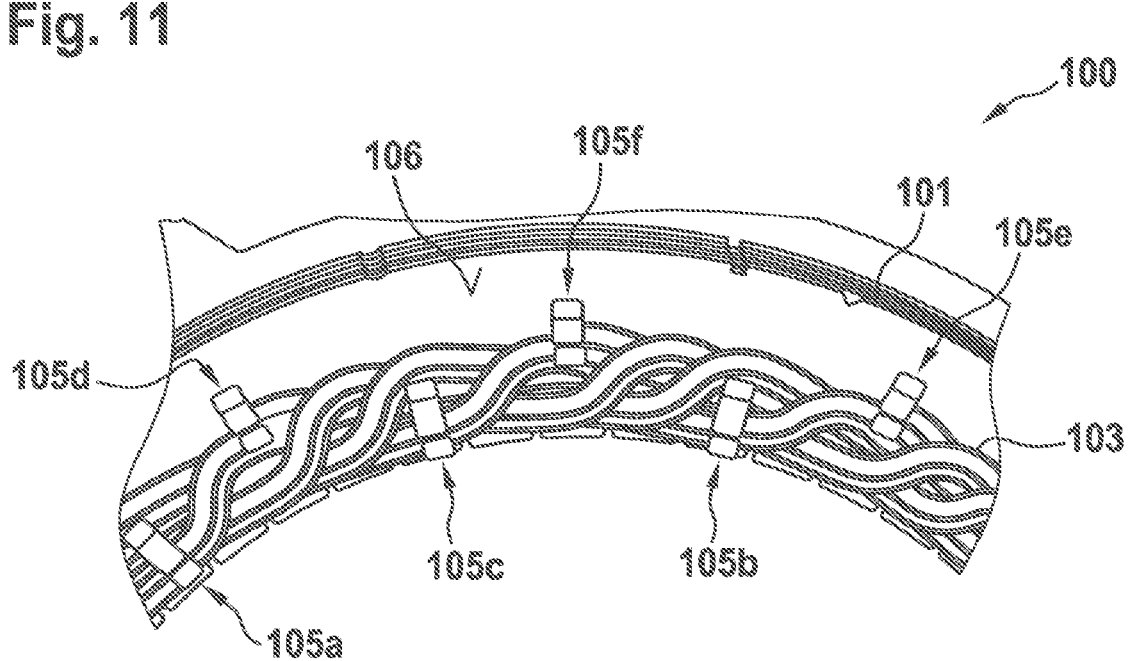
Figure 12:
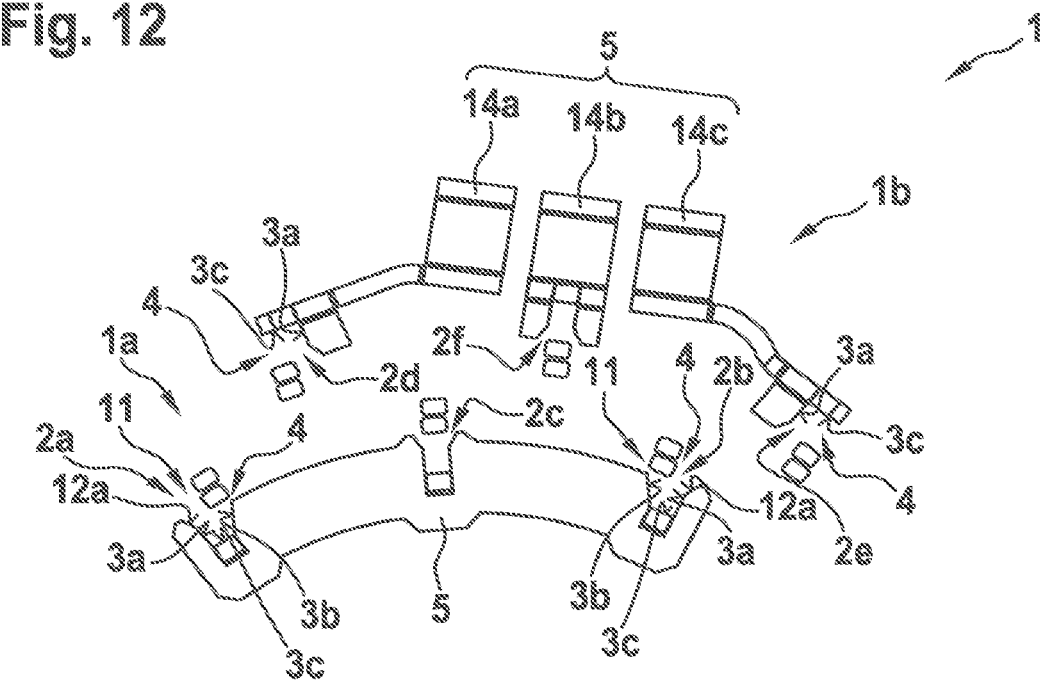
Figure 13:
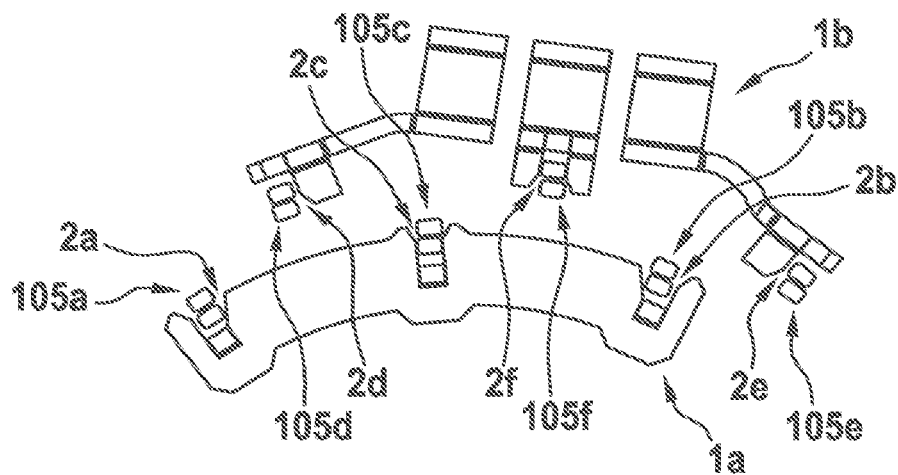
Figure 14:
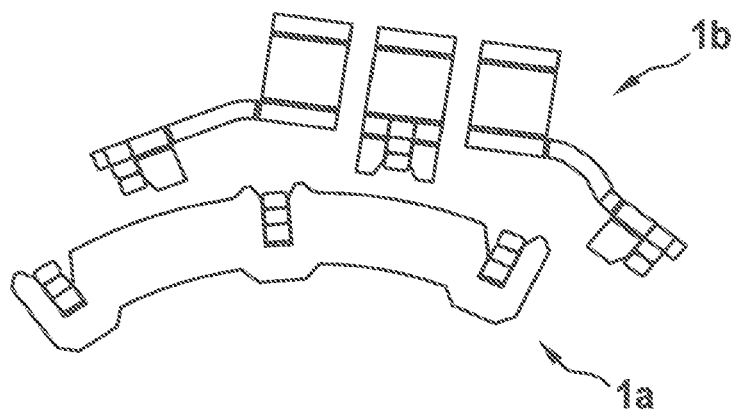
Figure 15:
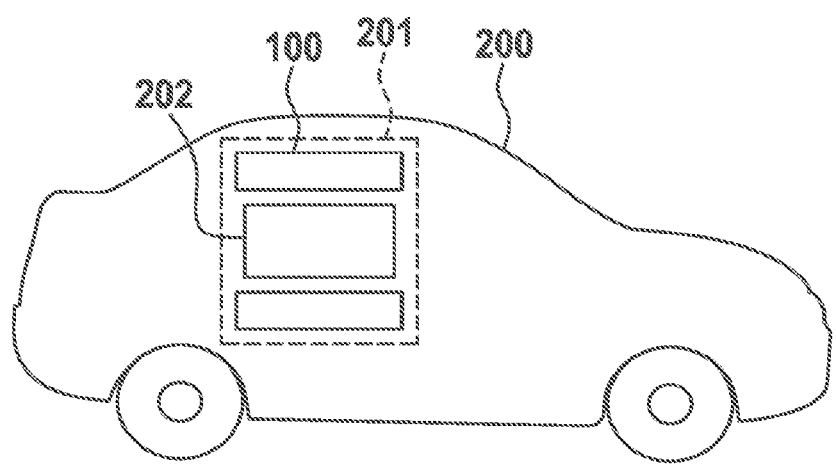

FIGS. 5 to 7 each show a plan view of the connection device during the transition from a detached position into a fastened position;

FIG. 8 shows a plan view of a second exemplary embodiment of the connection device according to the invention;

FIG. 9 shows a plan view of a third exemplary embodiment of the connection device according to the invention;

FIG. 10 shows a plan view of a fourth exemplary embodiment of the connection device according to the invention;

FIG. 11 shows a detailed view of an end face of a further exemplary embodiment of the stator arrangement according to the invention;

FIGS. 12 to 14 each show a plan view of the conductor arrangements according to a fifth exemplary embodiment of the connection device according to the invention for the stator arrangement shown in FIG. 12 during the transition from a detached position into a fastened position; and FIG. 15 shows a basic diagram of a vehicle having an exemplary embodiment of the electric machine according to the invention.

FIG. 1 is a plan view of a first exemplary embodiment of a connection device 1. The connection device 1 comprises a first connection unit 1a and a second connection unit 1b.

The first connection unit 1a comprises three contact portions 2a, 2b, 2c. The contact portions 2a, 2b, 2c are each designed for contacting one of three connection portions 105a, 105b, 105c of a stator 101 (see FIG. 3). In the present exemplary embodiment, each contact portion 2a, 2b, 2c comprises a first wall 3a and a second wall 3b which, in FIG. 1, are denoted by reference signs on the contact portion 2a, which is representative of the contact portions 2b, 2c. Each contact portion 2a, 2b, 2c forms a receiving chamber 4 which is designed to enclose one of the three connection portions 105a, 105b, 105c and is delimited by the first wall 3a and the second wall 3b. The walls 3a, 3b of all contact portions 2a, 2b, 2c are aligned parallel to each other. Moreover, each contact portion 2a, 2b, 2c comprises a third wall 3c which runs perpendicularly to the first wall 3a and the second wall 3b and likewise delimits the receiving chamber.

In addition, the first connection unit 1a comprises a conductor arrangement 5 which electrically conductively connects the contact portions 2a, 2b, 2c. For this, the conductor arrangement 5 is formed as an e.g. arcuate or crescent-shaped busbar. The contact portions 2a, 2b, 2c are formed as recesses in the conductor arrangement 5 or busbar.

The connection unit 1a furthermore comprises an insulation body 6 which is arranged on the conductor arrangement 5, and comprises openings 7a, 7b, 7c exposing the contact portions 2a, 2b, 2c. In the present exemplary embodiment, the insulation body 6 is moulded on the conductor arrangement 5 and formed by a cohesive sheath surrounding the conductor arrangement 5 in portions. The insulation body 6 is made of an electrically insulating material, e.g. a plastic.

The second connection unit 1b comprises three contact portions 2d, 2e, 2f. The contact portions 2d, 2e, 2f are each designed for contacting one of three connection portions 105d, 105e, 105f of a stator 101 (see FIG. 3). In the present exemplary embodiment, each contact portion 2d, 2e, 2f comprises a first wall 3a and a second wall 3b which, in FIG. 1, are denoted by reference signs on the contact portion 2d which is representative of the contact portions 2e, 2f. Each contact portion 2d, 2e, 2f forms a receiving chamber 4 which is designed to enclose one of the three connection portions 105d, 105e, 105f and is delimited by the first wall 3a and the second wall 3b. The walls 3a, 3b of all contact portions 2d, 2e, 2f are aligned parallel to each other. Moreover, each contact portion 2d, 2e, 2f comprises a third wall 3c which runs perpendicularly to the first wall 3a and the second wall 3b and likewise delimits the receiving chamber.

A conductor arrangement 5 of the second connection unit 1b is formed by a number of conductor portions 14a, 14b, 14c corresponding to the number of contact portions 2d, 2e, 2f. The conductor portions 14a, 14b, 14c are electrically insulated from each other and are each electrically conductively connected to one of the contact portions 2d, 2e, 2f. The conductor portions 14a, 14b, 14c are each formed by a busbar.

Like the first connection unit 1a, the second connection unit 1b furthermore comprises an insulation body 6 which is arranged on the conductor arrangement 5 and comprises openings 7a, 7b, 7c exposing the contact portions 2d, 2e, 2f. In the present exemplary embodiment, the insulation body 6 is moulded on the conductor arrangement 5 and formed by a cohesive sheath surrounding the conductor arrangement 5 in portions. The insulation body 6 is made of an electrically insulating material, e.g. a plastic. The insulation body 6 insulates the conductor portions 14a, 14b, 14c from each other and defines the mutual relative positions of the conductor portions 14a, 14b, 14c.

The connection device 1 comprises a fastening means 17. For this, the first connection unit 1a forms a first fastening portion 8 of the fastening means 17. In this exemplary embodiment, the first fastening portion 8 is formed by two latching elements 9a, 9b. The second connection unit 1b likewise forms a second fastening portion 10 of the fastening means 17, which is formed by latching elements 9c, 9d. In the first exemplary embodiment, the fastening portions 8, 10 or the latching elements 9a-d are formed by the insulation body 6 of the respective connection unit 1a, 1b.

The first fastening portion 8 is designed to engage with the second fastening portion 10 such that the first connecting unit 1a and the second connection unit 1b can be transferred from a detached position into a fastened position. In the fastened position, the first connection unit 1a and the second connection unit 1b are fastened to each other and the conductor arrangement 5 of the connection unit 1a and a conductor arrangement 5 of the second connection unit 1b are electrically insulated from each another.

FIG. 2 is a detailed view of the contact portion 2a which is shown representatively for the further contact portions 2b-f.

The contact portion 2a comprises a guide 11 which is widened relative to a distance d between the first wall 3a and the second wall 3b. The guide 11 here adjoins the first wall 3a and the second wall 3b on a side of the first wall 3a and of the second wall 3b opposite the third wall 3c. The guide 11 itself has a first wall 12a and a second wall 12b. The first wall 12a of the guide 11 adjoins the first wall 3a of the contact portion 2a on the side opposite the third wall 3c. The second wall 12b of the guide 11 adjoins the second wall 3b of the contact portion 2a on the side opposite the third wall 3c. The first wall 12a and the first wall 3a enclose an obtuse angle 13. Similarly, the second wall 3b and the second wall 12b enclose an obtuse angle. The walls 12a, 12b of the guide 11 each extend along a straight line. The straight lines intersect at an acute angle of around 60 degrees.

Figure 3:
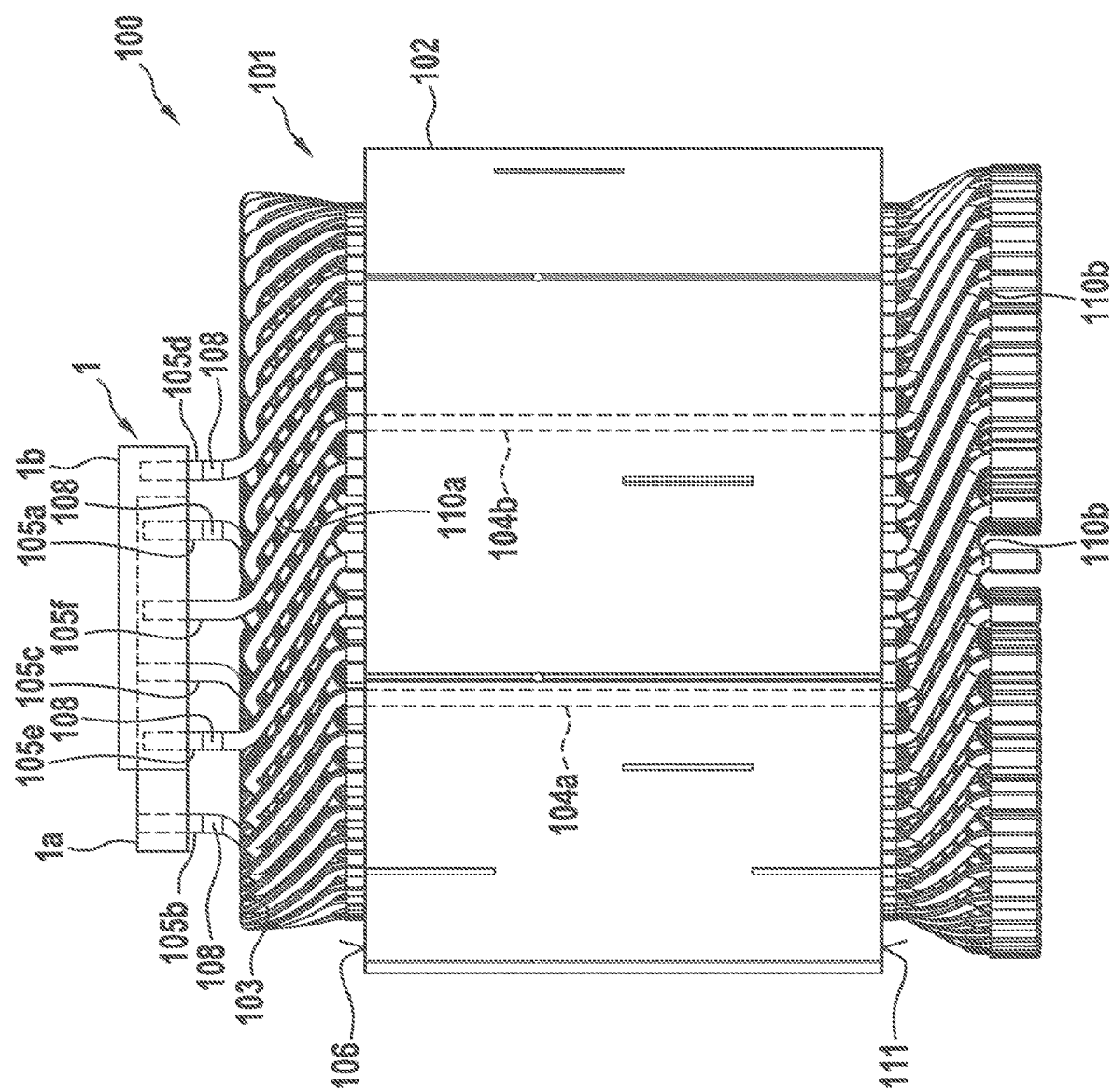
FIG. 3 shows a side view of an exemplary embodiment of the stator arrangement according to the invention having the first exemplary embodiment of the connection device.

FIG. 3 is a side view of an exemplary embodiment of a stator arrangement 100. The stator arrangement 100 comprises a stator 101, and the connection device 1 according to the first exemplary embodiment.

The stator 101 comprises a stator core 102 which is here formed for example from a multiplicity of axially layered stator laminations which are electrically insulated from each other and made from a soft magnetic material. In addition, the stator 101 comprises a stator winding 103 which is configured as a hairpin winding. The stator winding 103 comprises for example three phases and is formed in portions by shaped conductors 104a, 104b which extend through the stator core 102. The stator winding 103 is furthermore formed in portions by the first to the sixth connection portions 105a to 105f which extend in the axial direction at a first end face 106 of the stator core 102, adjoining part of the shaped conductors 104a, 104b in different angular positions of a circumferential direction.

The first to the third connection portions 105a, 105b, 105c are designed to form a star point. The fourth to the sixth connection portions 105d, 105e, 105f are each designed to form a connection for the phases. The first to the third connection portions 105a, 105b, 105c are arranged for example radially on the inside at the respective angular positions. The fourth to the sixth connection portions 105d, 105e, 105f are arranged for example radially on the outside at a respective one of the angular positions.

With reference to FIG. 1, a cross-section of a respective connection portion 105a-f has two parallel sides. The associated side faces 107a, 107b extend into the plane of the paper. For reasons of clarity, only the first connection portion 105a and the fourth connection portion 105d in FIG. 1 are denoted by reference signs. In the stator 101, the first and second connection portions 105a, 105b are deformed relative to the third connection portion 105c such that the pairs of parallel side faces 107a, 107b of the first to the third connection portions 105a, 105b, 105c are aligned substantially parallel to each other. Without this deformation, the connection portions 105a, 105b, 105c would be aligned radially because of the substantially cylinder-symmetrical form of the stator 101, so the corresponding pairs of side faces 107a, 107b would not be parallel but stand obliquely to each other corresponding to their position in the circumferential direction.

Similarly, the fourth and the fifth connection portions 105d, 105e are also deformed relative to the sixth connection portion 105f such that the pairs of parallel side faces 107a, 107b of the fourth to the sixth connection portions 105d, 105e, 105f are aligned substantially parallel to each other. In the present exemplary embodiment, the pairs of parallel side faces 107a, 107b of all connection portions 105a-f, i.e. the first to the sixth connection portions 105a-f, are not aligned parallel to each other. In other words, the pairs of parallel side faces 107a, 107b of the first to the third connection portions 105a, 105b, 105c on the one hand and the pairs of parallel side faces 107a, 107b of the fourth to the sixth connecting portions 105d, 105e, 105f on the other enclose between them an angle which is greater than zero degrees.

In the present exemplary embodiment, the connection portions 105a, 105b, 105d, 105e are deformed by twisting about an axis parallel to a longitudinal axis of the stator 101. For this, FIG. 4 shows schematically torsion portions 108 in which the course of the connection portions 105a, 105b, 105d, 105e has the twist.

In the present exemplary embodiment, for each of the phases, the stator winding 103 comprises two series circuits of shaped conductors 104a, 104b which form the parallel paths of the phase. In the present exemplary embodiment, each connection portion 105a-f comprises two connection elements 109a, 109b which are only denoted by a reference sign at connection portion 105c in FIG. 1 for reasons of clarity. A respective connection element 109a, 109b integrally adjoins one of the shaped conductors 104a, 104b on the outside with respect to one of the series circuits.

The stator winding 103 is furthermore formed in portions by a plurality of connectors of the first type 110a and connectors of the second type 110b. The shaped conductors 104a, 104b of a respective phase are connected together into the series circuits by the connectors of the first type 110a and connectors of the second type 110b. The connectors of the first type 110a are formed integrally with pairs of shaped conductors 104a, 104b. At a second end face 111 of the stator core 102 opposite the first end face 106, pairs of shaped conductors 104a, 104b which are not connected by connectors of the first type 110a are connected together by the connectors of the second type 110b. For this, the connectors of the second type have two connecting elements. The connecting elements are each formed integrally with one of the shaped conductors 104a, 104b connected by the connectors of the second type 110b. The connecting elements are connected together by substance bonding at the second end face 111, e.g. by welding.

Figure 4:
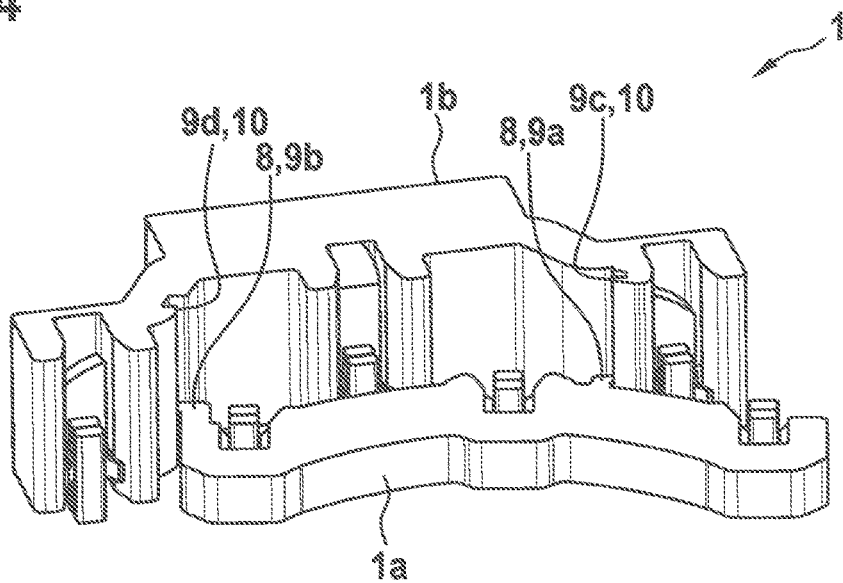
FIG. 4 shows a detailed perspective view of the connection device in the fastened position.

FIG. 4 shows a perspective, detailed view of the connection device 1 according to the first exemplary embodiment in the fastened position.

The fastening portions 8, 10 of the connection units 1a, 1b are connected such that they engage with each other in the fastened position so that the latching elements 9a, 9b and 9c, 9d form two latching connections.

FIGS. 5 to 7 each show a plan view of the connection device 1 during the transition from a detached position into the fastened position.

As shown in FIG. 6, the pairs of parallel side faces 107a, 107b of the connection portions 105a, 105b, 105c are arranged substantially parallel to each other when they are not yet received in the receiving chambers 4 of the contact portions 2a, 2b, 2c. However, there are certain mutual positioning tolerances of the connection portions 105a to 105c and of the connection elements 109a, 109b. The same applies to the connection portions 105d to 105f.

As shown in FIG. 6, the connection units 1a, 1b are moved towards each other in a linear movement direction perpendicular to the extent direction of the connection portions 105a-f, as indicated by the arrows in FIG. 6. The guides 11 here serve to compensate for the above-mentioned positioning tolerances. It should be noted that, in this exemplary embodiment, the connection portions 105a-f can be received in the receiving chambers 4 as a result of the previous deformation of the connection portions 105a, 105b, 105d, 105e. The necessary force for guiding the connection portions 105a-f between the parallel walls 3a, 3b would be too high if the connection portions 105a-f were aligned radially. It is possible here to connect the fastening portions by continuing the linear movement. However, it is also possible to connect the fastening portions via a movement parallel to the longitudinal axis of the stator.

FIG. 7 shows the connection device 1 in its fastened position in which the fastening portions 8, 10 are connected such that they engage with each other analogously to FIG. 4. In this position, the contact portions 2a-f and the connection portions 105a-f may be joined together for example by welding.

FIG. 8 is a plan view of a second exemplary embodiment of a connection device 1. The second connection unit 1b here corresponds to that according to the first exemplary embodiment. All statements relating to the first exemplary embodiment in FIGS. 1 and 2 can be applied to the second exemplary embodiment in FIG. 8 apart from the differences described below.

In the second exemplary embodiment, the first fastening portion 8 of the fastening means 17 is formed by the conductor arrangement 5 of the connection unit 1a, which protrudes from the isolation body 6 for this purpose. According to an alternative exemplary embodiment, it is also possible that the second fastening portion 10 of the fastening means 17 is formed by the conductor arrangement 5 of the second connection unit 1b when the first fastening portion 8—as in the first exemplary embodiment—is formed by the insulation body 6 of the first connection unit 1a.

FIG. 9 is a plan view of a third exemplary embodiment of the connection device 1. All statements relating to the first exemplary embodiment here can be applied to the third exemplary embodiment apart from the differences described below.

In the third exemplary embodiment, the first fastening portion 8 of the fastening means 17 is formed by protrusions 15a, 15b. The second fastening portion 10 is formed by recesses 16a, 16b which are designed in a diametrically opposed manner to the protrusions 15a, 15b. The protrusions 15a, 15b and the recesses 16a, 16b correspond with each other in the same way as two jigsaw pieces in order to fasten the connection units 1a, 1b together by means of a form fit. In the third exemplary embodiment, the connection units 1a, 1b are also connected by a linear movement such that they engage with each other in order to produce the form fit. The movement direction of the linear movement, however, runs parallel to the extent direction of the connection portions 105a-f.

FIG. 10 is a plan view of a fourth exemplary embodiment of a connection device 1.

In the present exemplary embodiments, the connection units 1a, 1b do not have fastening portions. In the fourth exemplary embodiment, the fastening means 17 is designed to force the first connection unit 1a and the second connection unit 1b together in the fastened position as a result of a force acting on the connection units 1a, 1b so that, in the fastened position, the connection portions 105a-f can be electrically conductively fastened to the contact portions 2a-f in the fastened position. This may be achieved for example by a substance-bonded joining technique, in particular by welding. The fastening means 17 is designed as an additional component of the connection device 1, which is separate from the connection units 1a, 1b. In the fastening position, in particular after producing the fastening of the connection portions 105a-f to the contact portions 2a-f, the fastening means is detachable so that the fastening means 17 does not remain on the stator arrangement 100.

FIG. 11 shows a detailed view of an end face of a stator 101 of a further exemplary embodiment of a stator arrangement 100. In the stator 101, the connection portions 105a-f are radially aligned in their respective angular position in the circumferential direction.

FIGS. 12 to 14 each show a plan view of the conductor arrangements 5 of the connection units 1a, 1b according to a fifth exemplary embodiment of the connection device 1 for the stator arrangement 1 shown in FIG. 11 during the transition from a detached position into a fastened position. For reasons of clarity, the illustration of the insulation body 6 and the fastening means 17 has been omitted in FIG. 12 to FIG. 14. However, all statements relating to the insulation body 6 and to the fastening means 17 of the previous exemplary embodiments can be applied to the fifth exemplary embodiment.

FIG. 12 shows the conductor arrangements 5 in the detached position of the connection units 1a, 1b.

In the first connection unit 1a, the respective second wall 3b of the first contact portion 2a and of the second contact portion 2b slopes away from the receiving chamber 4. The guide 11 of the first contact portion 2a and of the second contact portion 2b is formed by the first wall 12a, which adjoins the first wall 3a of the first contact portion 2a or of the second contact portion 2b. This means that a second wall 12b is not provided in the guide 11 of the first contact portion 2a and of the second contact portion 2b. The third contact portion 2c corresponds to that of the first exemplary embodiment.

In the second contact unit 1b, the respective receiving chamber 4 of the first contact portion 2d and of the second contact portion 2e is open on a side opposite the first wall 3a. This means that a second wall 12b is not provided in the first contact portion 2d and in the second contact portion 2e. The guide 11 of the first contact portion 2d and of the second contact portion 2e is formed by its first wall 12a, which adjoins the first wall 3a of the first contact portion 2d or of the second contact portion 2e. This means that a second wall 12b is not provided in the guide 11 of the second contact portion 2d and of the second contact portion 2e. The third contact portion 2c corresponds to that of the first exemplary embodiment.

As illustrated in FIGS. 12 to 14, the connection units 1a, 1b, analogously to FIGS. 5 to 7, are transferred from the detached position into the fastened position illustrated in FIG. 14. The sloping second walls 3b of the first and second contact portions 2a, 2b of the first connection unit 1a here also enable the positioning tolerances to be compensated in that the connection portions 105a, 105b may slide along the second walls 2a, 2b. As a result of the open configuration of the first and second contact portions 2d, 2e of the second connection unit 1b, the connection portions 105a, 105b can be prevented from becoming jammed during the linear movement. The arrangement of the connection device 1 on the connection portions 105a-f is therefore also enabled during the radial alignment thereof via the linear movement.

Exemplary embodiments of the method for producing a stator arrangement 100, explained in more detail with reference to FIGS. 1 to 14, are described below.

According to a first exemplary embodiment of the method, a step of providing a stator 101 is provided. A further step of providing a connection device 1 is furthermore provided. The method furthermore comprises a step of transferring the fastening means 17 from the detached position into the fastened position such that the contact portions of the first connection unit 1a contact the first to third connection portions 105a, 105b, 105c to form a star point and the contact portions of the second connection unit 1b contact the fourth to sixth connection portions 105d, 105e, 105f to form connections for the phases.

The transfer step here comprises executing a relative movement of the connection units 1a, 1b towards each other along an extent direction running perpendicularly to an extent direction of the connection portions 105a-f, so that the fastening portions 8, 10 engage with each other when the connection device 1 according to the first or second exemplary embodiment is used.

According to a second exemplary embodiment of the method, the transfer step comprises executing a relative movement of the connection units 1a, 1b towards each other along a movement direction running substantially parallel to an extent direction of the connection portions 105a-f, so that the fastening portions 8, 10 engage with each other when the connection device 1 according to the third exemplary embodiment is used.

According to a third exemplary embodiment of the method, the transfer of the fastening means 17 from the detached position into the fastened position comprises forcing the first connection unit 1a and the second connection unit 1b together by means of the fastening means 17 as a result of a force acting on the first connection unit 1a and the second connection unit 1b when the connection device 1 according to the fourth exemplary embodiment is used.

In the above-described exemplary embodiments of the method, a subsequent step of joining the connection portions 105a-f and the contact portions 2a-f to form substance-bonded joints, for example by laser welding, in the fastened position of the fastening means 17 is provided. In the second exemplary embodiment, subsequent steps of detaching the fastening means 17 and removing the fastening means 17 are provided.

FIG. 15 is a basic diagram of a vehicle 200 having an exemplary embodiment of an electric machine 201 which is designed to drive the vehicle 200.

The electric machine 201 comprises a stator arrangement 100 according to one of the above-described exemplary embodiments, or a stator arrangement 100 obtained by the method, and a rotor 202 mounted rotatably inside the stator arrangement 100. The electric machine 201 is configured as part of a drive train of the vehicle 200. The electric machine 201 may be a synchronous machine. The rotor 202 is preferably permanently excited. Alternatively, the electric machine 201 may be an asynchronous machine.

The vehicle 200 may accordingly be a battery electric vehicle (BEV) or a hybrid vehicle.

The invention claimed is:

1. Connection device for a stator having a stator winding, comprising a number N of phases, comprising a first connection unit and a second connection unit, which each comprise N contact portions and a conductor arrangement, wherein the contact portions of the first connection unit are each designed for electrically conductive contacting of one of N connection portions of the stator winding, and the conductor arrangement of the first connection unit electrically conductively connects the contact portions of the first connection unit, wherein the contact portions of the second connection unit are each designed for electrically conductive contacting of one of N further connection portions of the stator winding and the conductor arrangement of the second connection unit comprises N conductor portions, which are electrically insulated from each other and are each electrically conductively connected to one of the N contact portions of the second connection unit, wherein a fastening means is provided, by means of which the first connection unit and the second connection unit can be transferred from a detached position into a fastened position, in which the first connection unit and the second connection unit are fastened to each other and the conductor arrangement of the first connection unit and the conductor arrangement of the second connection unit are electrically insulated from each other.

2. Connection device according to claim 1, wherein the fastening means comprises a first fastening portion and a second fastening portion, which engage with each other in the fastened position, wherein one of the connection units comprises an insulation body, which is arranged on the conductor arrangement of the one connection unit and forms the first fastening portion, wherein the second fastening portion is formed by the other of the connection units.

3. Connection device according to claim 2, wherein the first fastening portion and the second fastening portion each form a latching element, wherein the latching element of the first fastening portion and the latching element of the second fastening portion are connected such that they engage with each other in the fastened position to form a latching connection.

4. Connection device according to claim 2, wherein:
one of the fastening portions forms a protrusion and the other of the fastening portions forms a recess corresponding to the protrusion, wherein the fastening portions engage with each other in the fastened position to produce a form fit.

5. Connection device according to claim 2, wherein the other of the connection units comprises an insulation body, which is arranged on the conductor arrangement of the connection unit and forms the second fastening portion.

6. Connection device according to claim 2, wherein the second fastening portion is formed by the conductor arrangement of the other of the connection units.

7. Connection device according to claim 1, wherein the fastening means is designed to force the first connection unit and the second connection unit together in the fastened position as a result of a force acting on the first connection unit and the second connection unit, so that the connection portions of the stator can be electrically conductively fastened to the contact portions, in particular by a substance-bonded joining technique.

8. Connection device according to claim 1, wherein a respective contact portion of the first connection unit is designed as a recess of the conductor arrangement of the first connection unit and/or a respective contact portion of the second connection unit is designed as a recess of one of the conductor portions of the conductor arrangement of the second connection unit.

9. Connection device according to claim 1, wherein the conductor arrangement of the first connection unit is designed as a busbar and/or a respective conductor portion of the conductor arrangement of the second connection unit is designed as a busbar.

10. Stator arrangement for an electric machine, comprising:
a stator, comprising a stator core having an axial end face and a stator winding, which comprises a number N of phases and is formed in portions by shaped conductors, which extend through the stator core, and by first to 2Nth connection portions, which extend in the axial direction at the end face, adjoining part of the shaped conductors in different angular positions of a circumferential direction; and
a connection device according to claim 1, wherein the contact portions of the first connection unit contact the first to Nth connection portions, in particular to form a star point, and the contact portions of the second connection unit contact the (N+1)th to (2N)th connection portions, in particular to form connections for the phases.

11. Method for producing a stator arrangement, comprising the following steps:
providing a stator, comprising a stator core having an axial end face and a stator winding, which comprises a number N of phases and is formed in portions by shaped conductors, which extend through the stator core, and by first to 2Nth connection portions, which extend in the axial direction at the end face, adjoining part of the shaped conductors in different angular positions of a circumferential direction;
providing a connection device according to claim 1;
transferring the fastening means from the detached position into the fastened position such that the contact portions of the first connection unit contact the first to Nth connection portions, in particular to form a star point, and the contact portions of the second connection unit contact the (N+1)th to (2N)th connection portions, in particular to form connections for the phases.

12. Method according to claim 11, furthermore comprising the following step:
joining the connection portions and the contact portions, in particular to form substance-bonded joints, in the fastened position of the fastening means.

13. Method according to claim 11, wherein the connection device comprises a transfer fastening means comprising a first fastening portion and a second fastening portion, which engage with each other in the fastened position, wherein one of the connection units comprises an insulation body, which is arranged on the conductor arrangement of the one connection unit and forms the first fastening portion, wherein the second fastening portion is formed by the other of the connection units, and
wherein the transfer of the fastening means from the detached position into the fastened position comprises:
executing a relative movement of the connection units towards each other along a movement direction running substantially perpendicularly to an extent direction of the connection portions so that the fastening portions engage with each other, or
executing a relative movement of the connection units towards each other along a movement direction running substantially parallel to an extent direction of the connection portions so that the fastening portions engage with each other.

14. Method according to claim 11, wherein the connection device comprises a fastening means designed to force the first connection unit and the second connection unit together in the fastened position as a result of a force acting on the first connection unit and the second connection unit, so that the connection portions of the stator can be electrically conductively fastened to the contact portions, in particular by a substance-bonded joining technique, and
    wherein the transfer of the fastening means from the detached position into the fastened position comprises: forcing the first connection unit and the second connection unit together by means of the fastening means as a result of a force acting on the first connection unit and the second connection unit; wherein, in particular, steps of detaching the fastening means and removing the fastening means are provided after joining the connection portions and the contact portions.

15. Electric machine for a driving a vehicle, comprising: a stator arrangement according to claim 10 and a rotor mounted rotatably inside the stator.

16. Connection device according to claim 3, wherein:
    one of the fastening portions forms a protrusion and the other of the fastening portions forms a recess corresponding to the protrusion, wherein the fastening portions engage with each other in the fastened position to produce a form fit.

17. Connection device according to claim 3 wherein
    the other of the connection units comprises an insulation body, which is arranged on the conductor arrangement of the connection unit and forms the second fastening portion.

18. Connection device according to claim 3, wherein
    the second fastening portion is formed by the conductor arrangement of the other of the connection units.

19. Connection device according to claim 2, wherein
    a respective contact portion of the first connection unit is designed as a recess of the conductor arrangement of the first connection unit and/or a respective contact portion of the second connection unit is designed as a recess of one of the conductor portions of the conductor arrangement of the second connection unit.

20. Connection device according to claim 2, wherein
    the conductor arrangement of the first connection unit is designed as a busbar and/or a respective conductor portion of the conductor arrangement of the second connection unit is designed as a busbar.

* * * * *